3,398,064
SCANNING COULOMETRY METHOD
AND APPARATUS
Robert C. Propst, Aiken, S.C., assignor to the United
States of America as represented by the United States
Atomic Energy Commission
Filed June 22, 1964, Ser. No. 377,144
10 Claims. (Cl. 204—1)

ABSTRACT OF THE DISCLOSURE

A scanning coulometric titration instrument and method for continuous electroanalytical determination of redox species in electrolyte solutions by recording the coulomb-potential curve of the redox species. A solution of an electrolyte and redox species is placed in an electrolysis cell that has an isolated electrode, a working electrode and a reference electrode. A potential difference (voltage) is maintained between the reference electrode and the working electrode while the electrolysis current passses between the isolated electrode and the working electrode. A scanning circuit that responds to changes in the electrolysis current is adapted to change the potential difference at a rate inversely proportional to changes in the electrolysis current. A recorder simultaneously records (1) changes in the potential difference at the working electrode and (2) the integral of the electrolysis current. A coulomb-potential curve of the titration of the particular redox species being scanned is thereby recorded. The coulomb-potential curve or coulogram shows the reactions that occur at the working electrode and the quantity of electricity consumed in the electrolysis by the redox species being analyzed.

The present invention relates generally to electrochemical coulometry and more particularly to a coulometric method and apparatus for scanning electrochemical reactions to record directly coulomb-potential curves of redox species in an electrolyte solution.

Electroanalytical coulometric investigations and determinations involving electrochemical reactions, particularly oxidation-reduction reactions, have heretofore been conducted with an instrument well known in the art as the controlled-potential coulometer. Using this instrument Faraday's law of electrolysis is applied to determine quantitatively any substance or species which can be made to undergo an electrochemical reaction. As used herein, the term "species" is defined as ions or elements which undergo oxidation or reduction (i.e., a transfer of electrons) in an electrolyte. Electrolysis is carried out in an electrolysis cell having (in addition to the electrolyte containing a sample species to be determined) a working electrode that is maintained at ground potential, a reference electrode, and an isolated electrode. Constant potential circuit means is used to maintain a desired fixed potential difference between the working and reference electrodes, and electrolysis current required for either oxidation or reduction flows between the working electrode and the isolated electrode. A readout circuit means is provided at the working electrode to indicate the electrolysis current as a function of time. In coulometric analysis with operation at constant potential, the electrolysis current decreases exponentially from a relatively large value (up to several amperes) to parctically zero. The quantity, Q, of electricity consumed during the electrolysis is measured by the integral $$\int^t i \, dt$$

where $i$ is the current in amperes flowing at any instant and $t$ is the time in seconds. The integration is performed graphically by measuring the area beneath a current-time curve from the readout circuit or electronically by attaching an integrator circuit means to the output from the working electrode, whereby the quantity of electricity consumed is measured directly and, with suitable recorder connections, is recorded as a coulomb versus time curve or a current versus coulomb curve. Thus, a controlled-potential coulometer effects a quantitative transformation of redox species from one valence state to another at a fixed potential and simultaneously integrates the electrolysis current required to effect the transformation. Prior art controlled-potential coulometers are thoroughly described in the following publications: Kelly, M. T., et al., Analytical Chemistry 31, 488 (1959), and Connelly, R. T., et al., USAEC Report HW–65919 (1960). A more sophisticated controlled-potential coulometer with transistorized power amplifier circuits is described by Propst, R. C., in USAEC Report DP–798 (1963).

Since the potential at which a particular redox species will either donate or accept electrons is characteristic of that species, it is desirable to plot graphically the coulomb readings, obtained in the manner described above, against the corresponding fixed or "control potential" at or near equilibrium throughout the electrolysis. Such a coulomb-potential curve for the electrolysis of a species is known in the art as a "coulogram". The shape of the coulogram is particularly pertinent since this shape is described by the Nernst equation. See Delahay, P., New Instrumental Methods in Electrochemistry, p. 30, Interscience Publishers, New York (1954). The Nernst equation expresses the ratio of the number of ions in the reduced state to the number in the oxidized state in terms of the potential at the working electrode, and is applicable to the ions present in the diffusion layer at the electrode surface. The potential at which the ratio of reduced to oxidized forms is unity is known as the half-wave potential. It is this half-wave potential which is characteristic of the species and is easily determined from the coulogram of the species. Thus, the coulogram is particularly significant since it is a pictorial representation of the electrochemical processes which occur at the working electrode during a titration analysis and the contributions of diverse processes can readily be identified.

Coulograms of redox species have been plotted using a controlled-potential coulometer by periodic manual adjustment of the control (fixed) potential to values at or near equilibrium throughout the electrolysis and noting the potential at each equilibrium point. Thus, an approximate coulomb-potential curve for the species can be constructed. However, this prior art method is highly inadequate, being neither sufficiently sensitive nor accurate, particularly where multiple redox species which electrolyze at close characteristic (or half-wave) potentials are present in the electrolyte. In addition to the poor precision, this prior method has no provision for simultaneous reading or plotting directly the coulomb versus electrode potential of an electrochemical reaction. In addition, background reactions of other interfering redox species cannot be readily identified and distinguished from the desired redox species.

It is therefore a principal object of this invention to provide an improved electroanalytical coulometer of increased sensitivity and accuracy.

Another object of this invention is to provide an improved coulometric method and apparatus for directly measuring coulombs versus potential for the electrolysis of a redox species.

It is another object of this invention to provide a means for rapid quantitative determination of small amounts of redox species in solution.

Still another object is to provide an improved electroanalytical coulometric titration instrument for the determination of redox species.

Other objects and advantages of this invention will become apparent to those skilled in the art upon consideration of the following description and the accompanying drawings in which.

The above objects are accomplished in the present invention by providing, in an electroanalytical coulometer, having an electrolysis cell, a scanning circuit means responsive to the electrolysis current between the working electrode and the isolated electrode and adapted to scan the potential of the working electrode versus the reference electrode at a rate inversely proportional to changes in the electrolysis current, and readout means responsive to both potential of the working electrode and electrolysis current. The electrolysis current, which is integrated to indicate on a recorder as coulombs, is recorded versus the potential of the working electrode at or near equilibrium throughout the electrochemical reaction or titration. The resulting coulomb-potential curve or coulogram shows the reactions that occur at the working electrode and the quantity of electricity consumed in the electrolysis by the particular redox species involved. Using the present scanning coulometer, a scan is initiated at the potential at which the working electrode is at equilibrium with respect to the ions in solution in the electrolysis cell. As the electrolysis current increases the scan rate decreases in an approximately inverse logarithmic manner so that the potential of the working electrode is never far from the equilibrium potential.

This scanning method is applicable to the determination of species that can be analyzed by conventional electrochemical techniques of polarography and controlled-potential coulometry, such as antimony, bismuth, cadmium, cobalt, copper, gold, lead, nickel, plutonium, silver, zinc, etc. In addition, a wide variety of electrodes can be used and the method is 100 times more sensitive than conventional electrochemical techniques. For instance, using this scanning method, as little as 25 micrograms plutonium per liter of solution and 70 parts per billion copper dissolved in laboratory distilled water have been titrated and coulograms recorded of the respective species.

Figure 1:
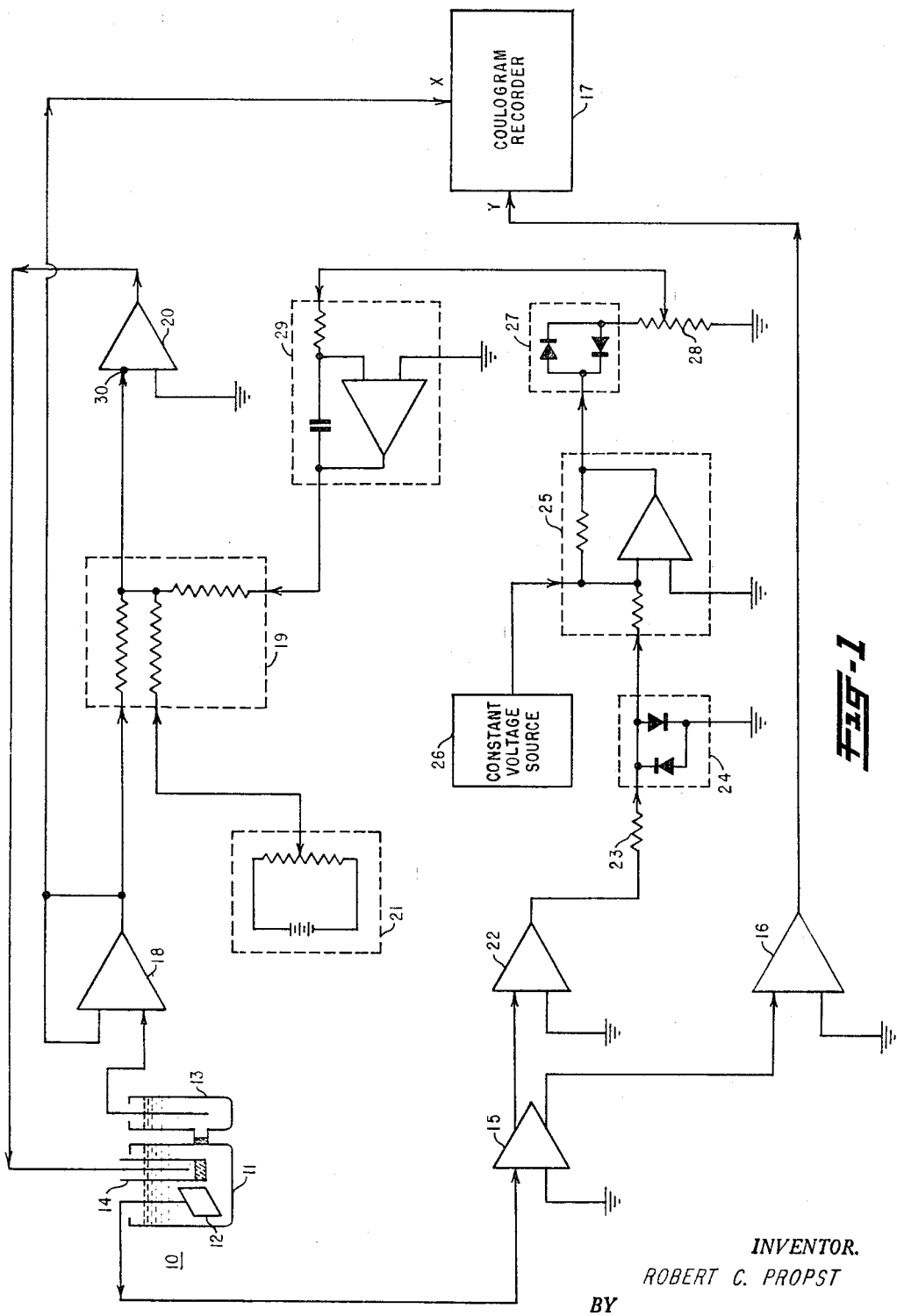
FIGURE 1 is a block diagram of the circuit used in the preferred embodiment of the electroanalytical scanning coulometer for recording an electrolysis coulogram.

Referring now to FIGURE 1, which shows a block diagram of a preferred embodiment of the present invention, the scanning coulometer utilizes a conventional three electrode electrolysis cell 10 comprising an electrolyte vessel 11 containing a suitable electrolyte in solution with the substance or redox species to be electrolyzed, a working electrode 12 at which the electrochemical (redox) reactions occur, a reference electrode 13 for potential measurements, and a counter or isolated electrode 14 to provide electrical contact with the electrolyte. The working electrode 12 may be any suitable electrode material; however, gold is the preferred electrode material. A mercury pool working electrode may be used, but its use results in a higher electrolyte background scan by a factor of two over the gold working electrode. The reference electrode 13 and the isolated electrode 14 may be of any suitable type known in the art, with mercurous sulfate and platinum, respectively, used in this preferred embodiment.

The working electrode 12 is connected to the current follower 15 which consists of a stabilized amplifier circuit similar to those used in conventional controlled-potential coulometers. The output from the current follower 15 is connected to the current integrator 16 which has a precision analog computer circuit with an output connected to the Y axis of an X—Y recorder or coulogram recorder 17. During an electrochemical reaction, electrolysis current flows between the working electrode 12 and the isolated electrode 14. The reference electrode 13 is utilized to monitor the potential of the working electrode 12, as will be described hereinafter, and essentially no current flows in this circuit. The working electrode 12 is maintained at ground potential at all times by the current follower 15 which also monitors the electrolysis current $i$ flowing in the electrolyte between the working electrode 12 and the isolated electrode 14. The current follower 15 produces an output voltage $E_1$ proportional to or a function of the instantaneous value of the electrolysis current. This output voltage $E_1 = f(i)$ is fed to the input of the current integrator 16 which integrates the voltage with respect to time. Thus, the output voltage $E_O$ from the current integrator 16 is proportional to the integral with respect to time of the instantaneous value of the electrolysis current, i.e.

$$E_O = \int i \, dt$$

is equal to the quantity Q of electrons consumed by the electrolysis or titration of a redox species, and is recorded as coulombs on the Y axis of the coulogram recorder 17.

The above-described portion of the scanning coulometer circuit is, of course, similar to the prior art controlled-potential coulometer and the instrument will function as a controlled-potential coulometer, if a fixed potential is maintained on the working electrode throughout the electrolysis. However, in accordance with the present invention, a scanning circuit responsive to variation or changes in the electrolysis current is adapted to scan and adjust the potential of the working electrode during an electrochemical reaction. The scan or changes in the potential of the working electrode are recorded on the coulogram recorder 17 as will be described hereinafter in detail. Referring again to the preferred embodiment of the scanning coulometer in FIGURE 1, the potential control and scanning circuit includes a voltage follower 18 connected to reference electrode 13 to monitor the potential of the working electrode 12 under essentially open circuit conditions. This voltage follower 18 is a high impedance follower amplifier and is inserted in series with a potential control amplifier 20 through a subtractor network 19 connected to the input of the potential control amplifier 20. The voltage follower 18 serves to isolate the reference electrode from the low input impedance of the potential control amplifier 20 and permits the use of the subtractor network 19 at the input of the potential control amplifier 20 so that multiple signal sources (each having a common ground return) from the rest of the circuit can be combined at a summing point 30 at the input to the potential control amplifier 20. The output of the voltage follower 18, which reflects the potential on the working electrode 12, is connected also to the X axis of the coulogram recorder 17 to record changes in potential during an electrochemical reaction.

The potential control amplifier 20 consists of a null amplifier for controlling the voltage between the isolated electrode 14 and the circuit ground (i.e., the working electrode 12). Thus, the output from the potential control amplifier 20 is connected to the isolated electrode 14 and inputs for signals, in addition to the voltage follower 18 output, are provided through the subtractor network 19, first from the electrode potential potentiometer 21 and second from the scan rate integrater 29. The electrode potential potentiometer 21 provides a suitable initial potential at the working electrode 12 to insure that the electrochemical reaction or titration is initiated at the equilibrium potential of the working electrode and in this preferred embodiment provides 0 to 1 volt positive or negative initial potential. Subtractor network 19 comprises a plurality of precision resistors, each having the same resistance, utilized to combine the multiple signal sources from the voltage follower 18, the electrode potential potentiometer 21 and the scan rate integrator 29 for input to the potential control amplifier 20. In this preferred embodiment 1.0 megohm precision resistors are used in the subtractor network 19. Since the output from the scan rate integrator 29 depends on changes in the electrolysis current reflected at the output of the current follower 15, an inverter amplifier 22 is connected to the current follower 15 to provide a voltage proportional to the electrolysis current for input through a dropping resistor 23 to a first state diode network 24 having logarithmic properties. The first diode network output and a constant voltage source 26 are connected to the input of a scan rate subtractor 25 which is essentially an adder-subtractor amplifier to control the scan rate by furnishing a charging current to the scan rate integrator 29 through a second diode network 27 and a scan rate potentiometer 28. This second diode network 27 is inserted between the scan rate subtractor 25 and the scan rate integrator 29 to reduce the logarithmic output of the subtractor 25 to a function suitable for integration in the scan rate integrator. The scan rate potentiometer 28 is interposed between the second diode network 27 and the scan rate integrator 29 to permit selection of any percentage of the maximum available scan rate. With this potentiometer set at zero, the instrument functions as a low capacity controlled-potential coulometer.

The output of the constant voltage source 25, the output of the electrode potential potentiometer 21, and the value of the resistances in the subtractor network 19 depend on the constant selected as the product of the electrolysis current and the scan rate. It has been found that for an electrolysis current range of from about 2 microamperes to about 20 microamperes, which represents the range of electrolysis currents usually encountered for the titration of microgram quantities of most redox species, the optimum constant is about $10^{-9}$ volt-amperes per second. Thus, the preferred embodiment of the present scanning coulometer utilizes the constant $10^{-9}$ volt-amperes per second for the product of the electrolysis current and the scan rate, and the various components are designed to utilize this constant.

Operational amplifiers for use in the scanning coulometer may be the type utilized in prior art controlled-potential coulometers. Stabilized amplifier units such as SK2–P and SK2–V, commercially available from George A. Philbrick, Researches, Inc., Boston, Mass., are deemed particularly suitable for use in the scanning coulometer. The integrator computor circuits utilized in the current integrator 16 and the scan rate integrator 29 are also well known in the art [see, Booman, G. L., Analytical Chemistry 29, 213 (1957), and Application Manual for Philbrick Octal Plug-in Computing Amplifiers, George A. Philbrick, Researches, Inc., Boston 10, Mass.]. The choice of silicon diodes for the diode networks is not critical although high current types are not satisfactory for logarithmic circuits. Suitable diodes, such as 1N1695, should give a linear plot of log $i$ versus applied voltage over a range of currents from $10^{-8}$ to $10^{-3}$ amperes.

Utilizing the potential control and scanning circuits during an electrochemical reaction, the output voltage $E_1 = f(i)_1$ from the current follower 15 is fed to the inverter amplifier 22 where it is inverted and multiplied through dropping resistor 23 (e.g., $-E_2 = 2E_1$) for input to the first diode network 24. The logarithmic properties of solid state diodes in the diode networks are then used to compute the approximate scan rate $$\left(\sim\frac{dE}{dt}\right)$$

Since the voltage across a solid state diode is a logarithmic function of the diode current, the output voltage of the first diode network is a logarithm of the input voltage. If the input voltage is $2E_1$, and assuming that the voltage developed across the first diode network 24 is negligable compared to the voltage at the output of the inverter 22, then the diode network output voltage is log $2E_1$. This diode voltage log $2E_1$ is fed to the scan rate subtractor 25 and subtracted from a constant voltage $E_k$ supplied by the constant voltage source 26 to give a voltage at the output of the subtractor 25 equal to $E_k - \log 2E_1$, and is then applied to a scan rate potentiometer 28 through a second diode network 27. Since the voltage developed across the resistance of the scan rate potentiometer 28 is small compared to the voltage across the diode network 27, its output is $E_k/2E_1$ which is a close approximation of the scan rate $$\sim\frac{dE}{dt}$$

is controlled by the scan rate potentiometer 27, and is applied to the scan rate integrator 29. Thus, the output voltage of the scan rate integrator 29 changes at the desired rate, $dE/dt$, and equals $$\int \frac{dE}{dt}$$

This output voltage from the scan rate integrator 28, which is inversely proportional to the electroylsis current, is applied to the subtractor network 19 along wtih signals from the voltage follower 18 and the electrode potential potentiometer 21. Designating the signals from the voltage follower 18 and the electrode potential potentiometer 21, $E_f$ and $E_p$, respectively, these signals and the output from the scan rate integrator 29 are combined by the subtractor network 19 at a summing point 30 at the input of the potential control amplifier 20. When the voltage $E_f$ from the voltage follower 18 is equal and opposite to the sum of the voltages $$E_p + \int \frac{dE}{dt}$$

from the electrode potential potentiometer 21 and the scan rate integrator 29, the potential at the summing point 30 will be zero and the potential at the working electrode is approximately at equilibrium with respect to the ions in solution in the electrolysis cell 10. The potential control amplifier 20 responds, not only to the error voltage from the reference electrode 13, but also to the scan voltage from the scan rate integrator 29. Thus, the potential control amplifier 20 supplies a voltage to the isolated electrode 14 such that $$E_f - \left(E_p + \int \frac{dE}{dt}\right) \simeq 0$$

where $E_f$ is the potential difference between the reference electrode 13 and the working electrode 12 and nearly equilibrium conditions are maintained throughout an electrochemical reaction.

In operation for the titration of a redox species, a solution containing the species to be determined is dissolved in a suitable electrolyte, such as a perchloric-sulfamic acid mixture, and placed in the electrolysis cell. The titration (either oxidation or reduction) is initiated at the potential at which the working electrode and the ions at its surface (diffusion layer) are in equilibrium with the species in the bulk of the solution. Since the working electrode is maintained at ground potential at all times by the current follower, titration is effected by applying a voltage between the isolated electrode and the circuit ground. During the titration, the rate of change of potential of the working electrode is controlled by the scan voltage developed by the scan integrator, as previously described, and applied to the potential control amplifier which in turn controls the potential of the working electrode. The product of the scan rate and the electroylsis current is a constant and, in the preferred embodiment of the coulometer, this constant is $10^{-9}$ volt-amperes per second. In the absence of an electrochemical reaction (or at low values of the electrolysis current), the coulometer scans the potential of the working electrode at a constant maximum scan rate (e.g., about one millivolt per second is deemed suitable for the titration of most redox species). When the electrolysis current increases during the titration as a result of encountering a redox species, the scan rate is decreased by the scanning circuit in an approximately inverse logarithmic manner so that the potential of the working electrode is never far from zero or equilibrium potential. Simultaneously the integrated values of the electrolysis current and changes in the poential of working electrode throughout the titration are recorded in the coulogram recorder to show the coulomb-potential curve for the redox species encountered during the titration.

While the selection of an electrolyte is not critical, it has been found that some electrolytes contribute less background currents than others. When using a gold working electrode, suitable supporting electrolytes, having minimum backgrounds, are perchloric acid, sulfuric acid, and sodium hydroxide.

The titration of redox species utilizing the scanning coulometer will be further illustrated by the following specific examples.

EXAMPLE I

Figure 2:
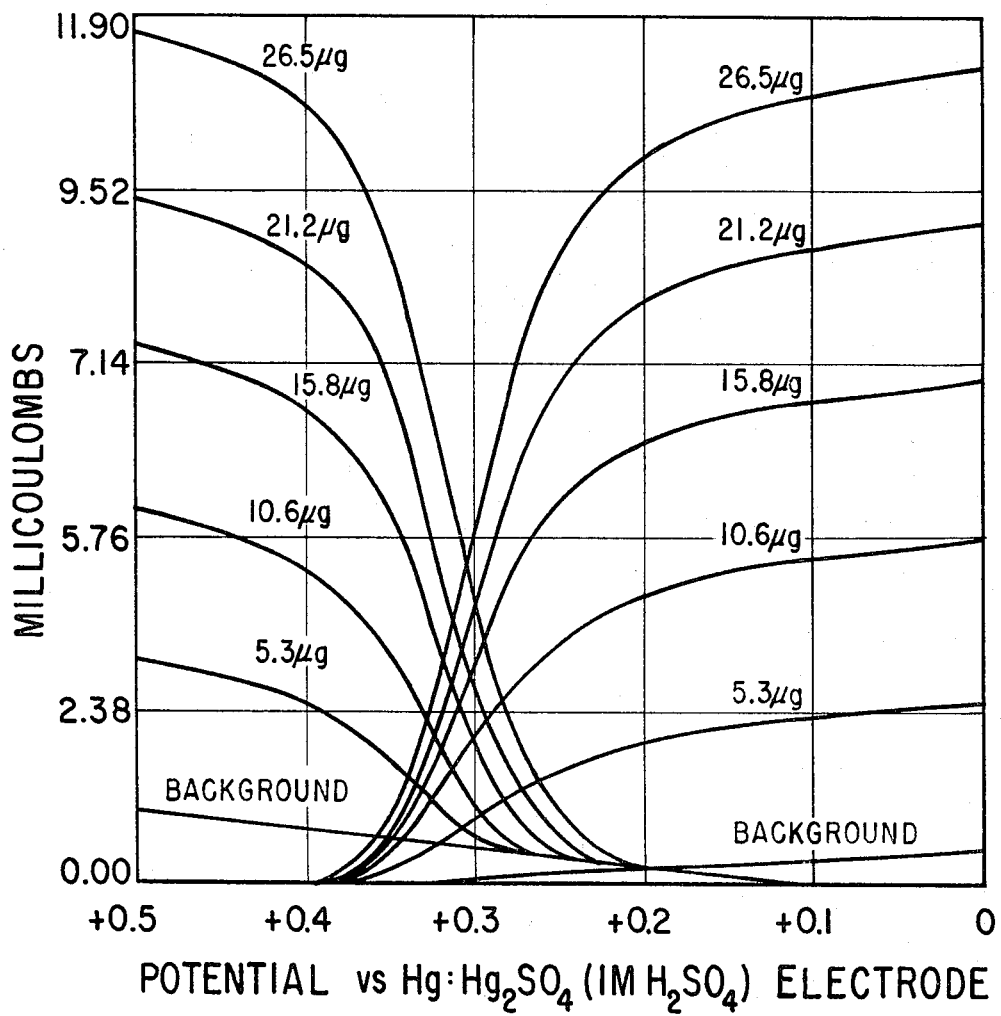
FIGURE 2 shows typical coulograms obtained by the titration of different microgram quantities of a plutonium redox species.

Five 10 ml. samples containing plutonium (III–IV) species in microgram quantities in a 0.1 M perchloric–0.01 M sulfamic acid electrolyte were titrated with the scanning coulometer using both oxidize and reduce scans beginning at the maximum scan rate of one millivolt per second. A gold working electrode was used and a background scan was recorded for both the oxidation and reduction titrations. The results were recorded directly on the coulogram recorder and are illustrated in FIG. 2. Concentrations of plutonium from $5.3\mu g$. per 10 ml. to $26.5\mu g$. per 10 ml. were analyzed with a precision of 0.6% and substantial agreement between the reduction and oxidation scans.

EXAMPLE II

A solution of irradiated nuclear fuel containing plutonium, 1.4 M uranium and trace concentrations of iron, silicon and various fission products, was titrated in a 0.1 M perchloric acid–0.01 M sulfamic acid electrolyte. Both oxidation and reduction scans were made in the scanning coulometer and the results recorded on the coulogram recorder. 240 micrograms plutonium per liter was detected and the coefficient of variation was 1% for a precision of 2%. The impurities in the solution had a negligible effect on the result and were easily distinguished from the plutonium.

EXAMPLE III

Figure 3:
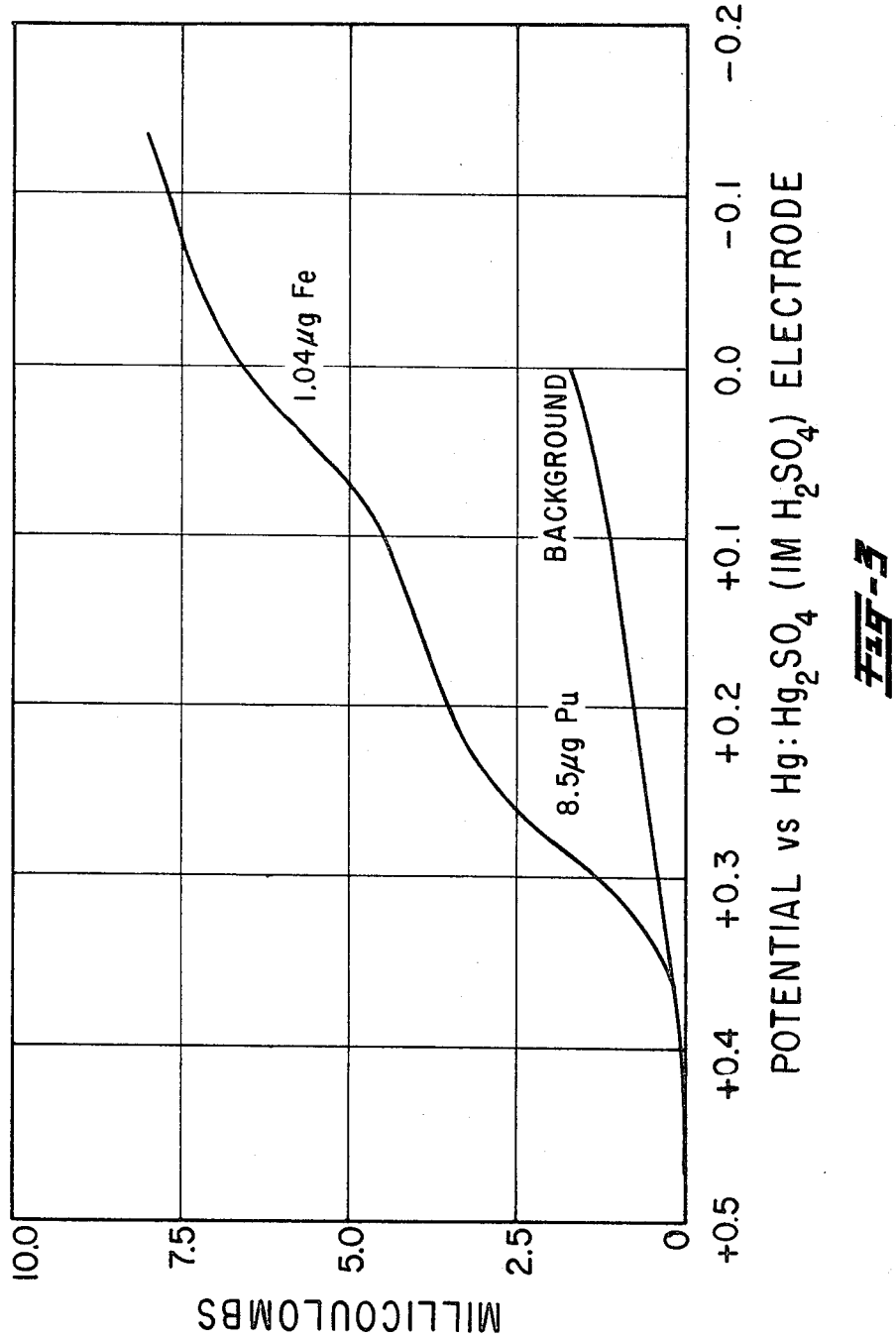
FIGURE 3 shows a coulogram obtained by the continuous titration of a solution containing plutonium species and iron species.

A solution containing microgram quantities of both plutonium and iron redox species in a 0.1 M perchloric acid electrolyte was titrated using both oxidation and reduction scans. The resulting coulograms are illustrated in FIG. 3. The curves for both the plutonium and iron titrations, which run consecutively, show the quantity of electricity consumed by each species at their characteristic (half-wave) potential. Substantial separation was obtained in spite of the close half-wave potential of the Fe (III)–Fe (II) redox species to the Pu (IV)–Pu (III) species.

It will be understood that the above embodiment and examples are merely illustrative and are not intended to limit the scope of this invention, which is limited only as indicated in the appended claims. Further, variations in apparatus and procedure may be made by one skilled in the art without departing from the scope of the invention.

What is claimed is:

1. In an electro analytical coulometer
   (a) an electrolysis cell containing in solution an electrolyte and a redox species, said cell provided with an isolated electrode, a working electrode, a reference electrode;
   (b) means for maintaining a potential difference between said reference electrode and said working electrode;
   (c) means for passing an electrolysis current between said isolated electrode and said working electrode;
   (d) a scanning circuit means responsive to said electrolysis current and adapted to scan said potential difference at a rate inversely proportional to changes in said electrolysis current; and
   (e) readout means responsive to both said potential difference and said electrolysis current.

2. The electroanalytical coulometer of claim 1 wherein the product of said electrolysis current and said scan rate is a constant.

3. An electroanalytical coulometer comprising
   (a) an electrolysis cell containing in solution an electrolyte and a redox species, said cell provided with an isolated electrode, a reference electrode and a working electrode;
   (b) means for maintaining a potential difference between said reference electrode and said working electrode;
   (c) means for passing an electrolysis current between said isolated electrode and said working electrode;
   (d) a scanning circuit means responsive to an increase in said electrolysis current and adapted to change said potential difference at said working electrode at a rate that decreases in an approximate inverse logarithmic manner in response to said increase in said electrolysis current; and
   (e) readout means responsive to both changes in said potential difference at said working electrode and said electrolysis current.

4. In an apparatus for recording a coulomb-potential curve for the electrolysis of a redox species
   (a) an electrolysis cell conttining in solution an electrolyte and a redox species, said cell provided with an isolated electrode, a working electrode, a reference electrode;
   (b) means for maintaining a potential difference between said reference electrode and said working electrode;
   (c) means for passing an electrolysis current between said isolated electrode and said working electrode; and
   (d) the improvement comprising scanning means for varying the potential difference at said working electrode at a rate inversely proportional to changes in said electrolysis current and readout means responsive to both changes in said potential difference at said working electrode and said electrolysis current.

5. A coulometric analysis instrument for the analysis of a redox species which comprises
   (a) an electrolysis cell containing in solution an electrolyte and a redox species, said cell provided with an isolated electrode, a reference electrode, and a working electrode;
   (b) means for passing an electrolysis current between said isolated electrode and said working electrode;
   (c) current follower means responsive to said electrolysis current and adapted to maintain said working electrode at ground potential whereby an output voltage is produced proportional to said electrolysis current;
   (d) potential control means adapted to maintain a potential difference between said reference electrode and said working electrode;
   (e) scanning means responsive to the output voltage of said current follower means and adapted to vary said potential difference at said working electrode at a rate inversely proportional to changes in said electrolysis current;

(f) voltage follower means adapted to respond to variations in said potential of said working electrode;

(g) current integrator means adapted to accumulate and integrate said output voltage as a function of time; and (h) readout means responsive to both variation in the potential of said working electrode and to the output of said current integrator means, and adapted to indicate a coulomb-potential curve of the analysis of said redox species.

6. The coulometric analysis instrument of claim 5 wherein said scanning means is adapted to vary the potential difference at said working electrode at a rate that decreases in an approximate inverse logarithmic manner in response to increases in said electrolysis current.

7. The coulometric analysis instrument of claim 5 wherein said scanning means comprises (a) an inverter amplifier to invert the output voltage from said current follower and provide a signal inversely proportional to said electrolysis current;

(b) a scan rate subtractor provided with a constant voltage source and disposed in series between first and second diode networks having logarithmic properties, said scan rate subtractor adapted to subtract said signals of said inverter amplifier from the output signal of said constant voltage source and to provide a scan rate signal;

(c) a scan rate integrator responsive to said scan rate signal of said scan rate subtractor for integrating said scan signal with respect to time; and (d) a subtractor network to combine signals from the voltage follower means and said scan integrator at said potential control amplifier to vary the potential difference between the reference electrode and the working electrode in response to said combined signals.

8. A method for the coulometric analysis for the electrolysis of a redox species which comprises (a) placing said redox species in an electrolyte solution disposed in an electrolysis cell, said cell provided with an isolated electrode, a reference electrode, and a working electrode;

(b) passing an electrolysis current between said isolated electrode and said working electrode;

(c) maintaining a potential difference between said reference electrode and said working electrode;

(d) varying said potential difference at a rate inversely proportional to changes in said electrolysis current;

(e) integrating said electrolysis current with respect to time; and (f) simultaneously recording the variations of potential difference and the integral of said electrolysis current whereby a coulomb-potential curve of the analysis of said redox species is indicated.

9. The method of claim 8 wherein the product of said electrolysis current and rate is a constant.

10. The method of claim 8 wherein said potential difference between said reference electrode and said working electrode is varied at a rate that decreases in an approximate inverse logarithmic manner in response to increases in said electrolysis current.

References Cited

"Analytical Chemistry," vol. 29, 1957, pp. 213–218.
"Analytical Chemistry," vol. 30, 1958 pp. 1716–1723.
"Analytical Chemistry," vol. 31, 1959, pp. 488–491.

HOWARD S. WILLIAMS, *Primary Examiner.*

T. TUNG, *Assistant Examiner.*